United States Patent
Álvarez De La Cadena Sillas et al.

(10) Patent No.: US 10,285,424 B2
(45) Date of Patent: May 14, 2019

(54) PROCESS FOR OBTAINING A SUCROSE-FLAVORED ADDITIVE

(71) Applicant: Héctor Alejandro Álvarez De La Cadena Sillas, Mexico City (MX)

(72) Inventors: Héctor Alejandro Álvarez De La Cadena Sillas, Mexico City (MX); Leonor López Cordoba, Mexico City (MX); Octavio Ramírez Rojas, Mexico City (MX)

(73) Assignee: Héctor Alejandro Álvarez De La Cadena Sillas (MX)

( * ) Notice: Subject to any disclaimer, the term of this patent is extended or adjusted under 35 U.S.C. 154(b) by 330 days.

(21) Appl. No.: 15/100,433

(22) PCT Filed: Nov. 28, 2014

(86) PCT No.: PCT/MX2014/000189
§ 371 (c)(1),
(2) Date: May 31, 2016

(87) PCT Pub. No.: WO2015/080546
PCT Pub. Date: Jun. 4, 2015

(65) Prior Publication Data
US 2016/0302461 A1    Oct. 20, 2016

(30) Foreign Application Priority Data

Nov. 28, 2013  (MX) .......................... A/2013/013972

(51) Int. Cl.
| | | |
|---|---|---|
| *A23L 27/10* | (2016.01) | |
| *C13B 10/02* | (2011.01) | |
| *C13B 20/00* | (2011.01) | |
| *C13B 50/00* | (2011.01) | |
| *A23L 27/30* | (2016.01) | |
| *A23L 5/20* | (2016.01) | |

(52) U.S. Cl.
CPC ................. *A23L 27/11* (2016.08); *A23L 5/23* (2016.08); *A23L 27/10* (2016.08); *A23L 27/115* (2016.08); *A23L 27/30* (2016.08); *A23L 27/33* (2016.08); *C13B 10/02* (2013.01); *C13B 20/005* (2013.01); *C13B 50/002* (2013.01)

(58) Field of Classification Search
CPC .......... C13B 10/00; C13B 10/02; C13B 10/14
See application file for complete search history.

(56) References Cited

U.S. PATENT DOCUMENTS

| | | | |
|---|---|---|---|
| 6,372,049 B1 | 4/2002 | Shimanskaya et al. | |
| 2003/0147978 A1* | 8/2003 | Araki ................... | A61K 31/715 424/750 |

FOREIGN PATENT DOCUMENTS

| | | |
|---|---|---|
| DE | 2060634 A1 | 6/1971 |
| DE | 2556109 A1 | 6/1977 |
| DE | 2560544 C2 | 5/1986 |
| EP | 1440623 A1 | 7/2004 |
| JP | 2000217540 A * | 8/2000 ............. A23L 1/221 |
| WO | 2008049256 A1 | 5/2008 |
| WO | 2008056331 A1 | 5/2008 |

OTHER PUBLICATIONS

Machine translation of JP 2000-217540 to Kokima. Publication date: Aug. 8, 2000. pp. 1-8. (Year: 2000).*
International Search Report for Application No. PCT/MX2014/000189 dated Mar. 18, 2015.

* cited by examiner

*Primary Examiner* — Jenna A Watts
(74) *Attorney, Agent, or Firm* — Lerner, David, Littenberg, Krumholz & Mentlik, LLP

(57) ABSTRACT

The invention for which the protection is requested consists of a procedure for extracting a flavoring without caloric value based on sugar cane concentrates of the intermediate honeys and molasses obtained from sugar extraction by the sugar mills, which is mixed with artificial high yield sweeteners, where said additive provides said high yield sweeteners with the flavor of sugar cane.

8 Claims, No Drawings

PROCESS FOR OBTAINING A SUCROSE-FLAVORED ADDITIVE

CROSS REFERENCE TO RELATED APPLICATIONS

The present application is a national phase entry under 35 U.S.C. § 371 of International Application No. PCT/MX2014/000189, filed Nov. 28, 2014, published in Mexico, which claims the benefit of Mexican Patent Application No. MX/a/2013/013972, filed Nov. 28, 2013. The disclosures of said applications are incorporated by reference herein.

FIELD OF THE INVENTION

During recent years and to date, the use of artificial sweeteners, whether by medical prescription or for diet purposes, has increased exponentially; however, their use is not fully accepted, due especially to the fact that these sweeteners give a strange taste to the palate of their consumers, a sensation which lasts for more or less extensive periods of time, which has had a certain restrictive influence on their use.

Examples of these sweeteners defined as high-intensity are steviol glycosides, acesulfame potassium, saccharine and its sodium, potassium and calcium salts, aspartame, cyclamate, neohesperidin dihydrocalcone, neotame and alitame, etc., which can give a strange taste such as bitter, metallic, sour, salty, milky or a combination of these.

BACKGROUND OF THE INVENTION

In the field in question, that is, the use and consumption of artificial sweeteners, a large number of proposals have been put forward for the purpose of improving the flavor, which is precisely the factor which still limits to some extent their degree of acceptance; attempts have been made to resolve this problem in many ways, particularly by the addition of additives without sweetening properties such as maltol, ethyl maltol, citric acid, tartaric acid, quinine sulfate, etc., additives which to a certain extent disguise the strange taste of the saccharine according to the proposal contained in German patent DE-A 20 60 634. In the same manner, mention has been made in patents DE-C 25 60 544 and DE-A 25 56 109 of the use of potassium and aluminum sulfate or naryngine as additives for the aspartame and cyclamate for the purpose of modifying the taste of these sweeteners.

On another aspect, the use of artificial sweetener mixes has also been proposed in order to provide them with a better taste similar to that of sugar cane, as well as to balance the fast or slow perception given by some of these artificial sweeteners give to the taste buds of those consuming these products, or else adding to these high-yield sweeteners a concentrated preparation of dearomatized fruits in order to raise or improve its sucrose flavor, in addition to many other suggestions, all for the purpose of disguising the strange flavors usually given by artificial sweeteners or to provide them with a flavoring sensation similar to sucrose and even balance the duration and rapidity with which the sweetness of these is perceived, all forming part of the well-known art applied by the artificial sweetener industry. It would however appear that these sweeteners have not fully satisfied the consumers of these products.

My principal therefore proposes a novel and useful technique for improving the taste of artificial sweeteners, for the specific purpose of giving these non-caloric sweeteners an improved taste similar to sucrose extracted from sugar cane, the resulting product of which, that is the resulting additive combined with said sweeteners, can be applied to the preparation of numerous candies, bread-making products, sweets, chocolates, beverages, etc.

It is evident from the foregoing that a not-fully-satisfied need exists for placement on the market of an additive for the purpose of improving the acceptance of non-caloric sweeteners. The present invention attempts to resolve this problem by supplying an additive which gives these sweeteners a flavor similar to that of sugar without adding an undesired caloric value to these sweeteners specifically not recommended for diabetics, or those whose diet attempts to eliminate the consumption of calories as part of a diet recommended by the respective physician.

The invention subject matter of the present application proposes a novel procedure for the preparation of an additive which, mixed with the non-caloric high yield sweeteners, gives these a taste similar to that of sugar cane, thus promoting a higher acceptance among consumers. This invention is the result of a long and successful research.

OBJECTS OF THE INVENTION

It is therefore a main object of the invention to place a product or additive on the market the use of which, mixed with high yield sweeteners, gives these a taste similar to that of sucrose, thus increasing consumer acceptance of these sweeteners.

An additional object of the invention is a process for preparing a flavoring for use in non-caloric sweeteners in order to give these a taste similar to sugar extracted of sugar cane, thus eliminating or dissimulating their odd flavors.

Yet another object of the invention is a procedure for the preparation of an additive obtained from a concentrated sugar cane extract, or from the intermediate honeys or molasses deriving from sugar mill sugar extraction for adding to high yield sweeteners, in order to give these a sugar cane flavor.

An additional object of the invention is the preparation of a sweetener based on artificial sweeteners mixed with the additive of the invention, useful in the manufacture of candies, beverages, baked products, etc., by means of which the odd flavors of said high yield sweeteners are avoided, reduced or dissimulated.

DETAILED DESCRIPTION OF THE INVENTION

In view if the foregoing, the invention of the present application provides a novel procedure for the preparation of an additive which, on incorporation to the high yield sweeteners, provides them with a taste similar to that of (cane sugar), thus improving consumer acceptance of this type of sweetener which can be used in many types of candies, sweets, chocolates, baked products, beverages, etc.

The process of the invention consists of the following steps:

a) Eliminate the salts from the concentrated sugar cane extract or from the intermediate honeys and molasses obtained from sugar mill sugar extraction, which contains dissolved solids in a range of between 80 to 85%, by adding to this distilled water extract a concentration of dissolved solids in a range of between 40 to 50%, and treating this diluted concentrate with a mineral acid, preferably sulfuric acid;

b) Heat the previously-acidulated-and-diluted concentrate at a critical temperature of between 75 to 80° C., cool the resulting product to 50° C. and remove the precipitated insoluble salts by filtering;

c) Insolubilize of the honeys thus obtained from sucrose by means of organic solvents, obtaining in this way a product with no sucrose content but with a sugar cane taste;

d) Recover the liquid by filtering in order to separate the crystallized and precipitated sucrose and the solvent, by distillation and, with a high reflux, the liquid aqueous phase of the liquid medium without mineral salts and sucrose.

e) Sterilize the recuperated liquid phase in a bioreactor, inoculating this liquid phase with an osmotolerant yeast in order to fully eliminate the reducing sugars, obtaining in this way a liquid with 14 to 15% of soluble solids comprising the products conferring the sugar cane taste, free from disaccharides or monosaccharides;

f) Filter the product obtained in the previous stage, and;

g) Adjust the pH of the filtered liquid, brown in color, containing a maximum of 20% solids in a range from 3.5 to 4.5, by adding a 50% potassium hydroxide solution.

The flavoring or additive thus obtained, on being added to or mixed with non-caloric sweeteners, gives these a taste similar to that of cane sugar, which is much more pleasant that that given by these sweeteners, without adding calories, making them more attractive for human consumption and particularly so for persons suffering from diabetes or who, for reasons of diet, wish to lower consumption of the calories contained in sugar-sweetened food products.

Given below for the purpose of further extending an understanding of the process subject matter of this application, several examples are given for putting the invention into practice:

Example 1

Purification of the Concentrated Extracts of Inorganic Salts Obtained from Sugar Cane, or of the intermediate honeys and molasses obtained from sugar extraction by the sugar mills.

To 50 Kg of the extract containing 80-85% brown colored dissolved solids of not less than 6000 international ICUMSA color units, 50 Kg of bi-distilled water is added, placed in a stainless steel steam-heated T 304 reactor with a 1 HP stirrer and marine-type propeller. Sulfuric acid, nitric acid, phosphoric or hydrochloric acid are added in a range of 0.1 to 1 Kg to obtain a pH of 1.5 in the solution, this is homogenized for two hours and heated in 10° C. ramps, maintaining each temperature for 1 hour until 80° is reached, stirring constantly. After maintaining an 80° C. temperature for one hour the steam source is closed and stirring stopped, allowing the mixture to stand for 8 hours. The product is filtered through a mud-removing filter press, eliminating inorganic salts. A yield of 90 Kg is obtained. The product is returned to the reactor and the pH adjusted in a range of 4.5 to 5.5 with food grade potassium hydroxide, obtaining a product with an insoluble salt content of from 0.06 to 0.6%, dark brown in color, of 6000 international units ICUMSA color with a soluble solids concentration of from 40 to 50 Brix, containing 90% sucrose.

Example 2

Extraction of Sucrose obtained from the Product Concentrate of the Previous Example.

This stage is carried out as follows: To 10 Kg of the product from the previous example, 90 Kg of 98-99% pure ethylic alcohol is added in a closed reactor of T304 stainless steel having a heating system, a torispherical base, a side exit above the base and a stirring system with a 1 HP motor and marine propeller. The product is stirred to mix and heated at 40° C. for one hour. The stirring is stopped and the mixture allowed to stand and decanting for three hours. At the base of reactor remains up to 90% of the sucrose, two phases remaining in the reactor. The liquid phase is removed, filtering this through a filter press, and transferred to distilling equipment with a reflux system. This is distilled at 72-80° C. recovering a 92% pure ethylic alcohol, and recovering the base with a 98-99% efficiency of dissolved solids, with a water adjustment of up to 18-20% soluble solids using bi-distilled water. This base is used in the following operation of the process.

Example 3

The product obtained from the foregoing example is filtered to stabilize the product which will serve as a means of cultivation to cleanse it from any monosaccharides present due to hydrolysis of the sucrose from the mineral acid and heat treatment, and forwarded to a T305 stainless steel bioreactor. The bioreactor is loaded with 140 liters (density 1.08 g/liter) and a 5% preinocule of an osmotolerant yeast culture added with aeration of 1 to 1.6 maximum vvm. The culture is maintained at 30° C. for 7 days when the stationary phase the culture is reached. The ventilation is stopped and the culture means filtered to separate the liquid phase, recovering the yeast mass in the filter press. The filtered product terminates with dissolved solids concentration of between 14 and 15 Brix, the pH is adjusted in the 3.5 to 4.5 range, dark brown in color, of over 6000 international units ICUMSA color.

It can be clearly seen from the foregoing that both the process for preparation of the additive and the additive itself comply fully with the objects of the invention and, in view of the fact that changes may take place to this proposal, it is intended that these form part of the invention proposed, always providing that said changes come within the scope and spirit of the attached claims.

The invention claimed is:

1. Process for obtaining a sucrose-flavored additive, characterized by comprising:
  a) Eliminating mineral salts from concentrated extracts obtained from sugar canes or from intermediate honeys and molasses deriving from sugar extraction by sugar mills by a diluted and acidulated medium to obtain an acidulated-and-diluted concentrate;
  b) Heating to a critical temperature and cooling the acidulated-and-diluted concentrate that is obtained from step a);
  c) Insolubilizing sucrose from the resulting product thus obtained from step b) by an organic solvent, in order to remove the sucrose content;
  d) Recovering by distillation of a, liquid aqueous phase from the resulting product obtained from step c);
  e) Sterilizing the recovered liquid aqueous phase from step d) in a bioreactor by inoculating with an osmotolerant yeast, in order to fully eliminate the reducing sugars, thus obtaining vinasse;
  f) Filtering the vinasse obtained from step e), and;
  g) Adjusting the pH of the filtered liquid from step f), brown in color, containing a maximum of 20% solids, to an approximate value of between 6 and 8.

2. The process in accordance with claim 1, wherein the diluted and acidulated medium is sulfuric acid.

3. The process in accordance with claim 1, wherein the critical temperature is between 75 to 80° C.

4. The process in accordance with claim 1, wherein the organic solvent utilized to insolubilize the sucrose from the resulting product thus obtained from step b) is anhydrous ethanol.

5. The process in accordance with claim 1, wherein step e) involves a purification of monosaccharides in the recovered liquid aqueous phase from step d) with the osmotolerant yeast.

6. A process for obtaining a sucrose-flavored sweetener, consisting of mixing a high yield sweetener with the sucrose-flavored additive obtained from the process in accordance with claim 1 in a proportion depending on the type of the high yield sweetener.

7. The process in accordance with claim 6, wherein the proportion of the sucrose-flavored additive to the high yield sweetener is from 1 to 0.75.

8. The process in accordance with claim 6, where the high yield sweetener is selected from the group consisting of steviol glycosides, potassium acesulfame, saccharine and its sodium, potassium and calcium salts, aspartame, cyclamate, neohesperidin dihidrocalcone, neotame and alitame.

* * * * *